(12) United States Patent
Joseph

(10) Patent No.: US 11,995,160 B2
(45) Date of Patent: May 28, 2024

(54) GRAPHICAL USER INTERFACE AND CONSOLE MANAGEMENT, MODELING, AND ANALYSIS SYSTEM

(71) Applicant: Shawn Joseph, Austin, TX (US)

(72) Inventor: Shawn Joseph, Austin, TX (US)

(*) Notice: Subject to any disclaimer, the term of this patent is extended or adjusted under 35 U.S.C. 154(b) by 0 days.

(21) Appl. No.: 17/671,039

(22) Filed: Feb. 14, 2022

(65) Prior Publication Data
US 2022/0269757 A1 Aug. 25, 2022

Related U.S. Application Data

(63) Continuation of application No. 17/327,727, filed on May 23, 2021, now Pat. No. 11,250,112.

(60) Provisional application No. 63/190,513, filed on May 19, 2021, provisional application No. 63/189,223, filed on May 16, 2021, provisional application No. 63/161,742, filed on Mar. 16, 2021, provisional application No. 63/154,565, filed on Feb. 26, 2021, provisional application No. 63/153,087, filed on Feb. 24, 2021.

(51) Int. Cl.
*G06F 21/31* (2013.01)
*G06F 16/24* (2019.01)

(52) U.S. Cl.
CPC .............. *G06F 21/31* (2013.01); *G06F 16/24* (2019.01)

(58) Field of Classification Search
CPC .................................. G06F 16/24; G06F 21/31
See application file for complete search history.

(56) References Cited

U.S. PATENT DOCUMENTS

| | | | | |
|---|---|---|---|---|
| 9,195,978 B1* | 11/2015 | Rose | ................. | G06Q 20/042 |
| 2004/0122756 A1* | 6/2004 | Creeden | ................. | G06Q 40/08 |
| | | | | 705/35 |
| 2005/0080701 A1* | 4/2005 | Tunney | ................. | G06Q 40/08 |
| | | | | 705/30 |
| 2012/0254064 A1* | 10/2012 | Howard | ................. | G06Q 40/06 |
| | | | | 705/36 R |
| 2014/0081890 A1* | 3/2014 | Casiano | ................. | G06Q 40/06 |
| | | | | 705/36 T |
| 2020/0184048 A1* | 6/2020 | Toth | ................. | G06N 20/00 |
| 2020/0184583 A1* | 6/2020 | Richards | ............. | G06F 16/9035 |
| 2020/0258176 A1* | 8/2020 | Gibson | ................. | G06F 21/32 |
| 2020/0387544 A1* | 12/2020 | Smith | ................. | G06Q 10/103 |
| 2021/0158298 A1* | 5/2021 | Rodeghiero | ......... | G06Q 10/107 |

\* cited by examiner

*Primary Examiner* — Thien M Le

(57) ABSTRACT

One or more graphical user interfaces (GUIs) and/or a console management, modeling, and analysis system is described. In some embodiments, the GUI and/or management system can be used to analyze investment purchases and/or sales. In some embodiments, users may be allowed to enter data used to produce dynamic models. In some embodiments, data may be aggregated from various users and/or sources to provide adaptive, dynamic models and/or projections.

41 Claims, 8 Drawing Sheets

| | Jan-19 | Feb-19 | Mar-19 | Apr-19 | May-19 | 19-Jun | 19-Jul | 19-Aug | 19-Sep | 19-Oct | 19-Nov | 19-Dec |
|---|---|---|---|---|---|---|---|---|---|---|---|---|
| INCOME | | | | | | | | | | | | |
| Gross Potential Rent | 52,000 | 52,000 | 52,000 | 52,000 | 52,000 | 52,000 | 52,000 | 52,000 | 52,000 | 52,000 | 52,000 | 52,000 |
| Parking | 2000 | 1900 | 1800 | 2000 | 1900 | 2000 | 2000 | 2000 | 2000 | 2000 | 2000 | 2000 |
| Laundry | 0 | 0 | 0 | 0 | 0 | 0 | 0 | 0 | 0 | 0 | 0 | 0 |
| Fees | 0 | 0 | 0 | 0 | 0 | 0 | 0 | 0 | 0 | 0 | 0 | 0 |
| (-) Vacancy | 2500 | 2500 | 2500 | 2500 | 2000 | 2000 | 2000 | 2500 | 2500 | 2500 | 3000 | 2000 |
| (-) Bad Debt | 0 | 0 | 0 | 0 | 0 | 0 | 0 | 0 | 0 | 0 | 0 | 0 |
| (-) Loss to Lease | 0 | 0 | 0 | 0 | 0 | 0 | 0 | 0 | 0 | 0 | 0 | 0 |
| TOTAL | 51,500 | 51,400 | 51,300 | 51,500 | 51,900 | 52,000 | 52,000 | 51,500 | 51,500 | 51,500 | 51,000 | 52,000 |
| EXPENSES | | | | | | | | | | | | |
| Administrative | 0 | 0 | 0 | 0 | 0 | 0 | 0 | 0 | 0 | 0 | 0 | 0 |
| Marketing | 0 | 0 | 0 | 0 | 0 | 0 | 0 | 0 | 0 | 0 | 0 | 0 |
| Property Taxes | 15000 | 15000 | 15000 | 15000 | 15000 | 15000 | 15000 | 15000 | 15000 | 15000 | 15000 | 15000 |
| Insurance | 11000 | 11000 | 11000 | 11000 | 11000 | 11000 | 11000 | 11000 | 11000 | 11000 | 11000 | 11000 |
| Contract Services, Maintenance | 2400 | 2400 | 2400 | 2400 | 2400 | 2400 | 2400 | 2400 | 2400 | 2400 | 2400 | 2400 |
| Trash | 900 | 900 | 900 | 900 | 900 | 900 | 900 | 900 | 900 | 900 | 900 | 900 |
| Electric | 4500 | 4500 | 4500 | 4500 | 4500 | 4500 | 4500 | 4500 | 4500 | 4500 | 4500 | 4500 |
| Gas | 0 | 0 | 0 | 0 | 0 | 0 | 0 | 0 | 0 | 0 | 0 | 0 |
| Water and Sewer | 2000 | 2000 | 2000 | 2000 | 2000 | 2000 | 2000 | 2000 | 2000 | 2000 | 2000 | 2000 |
| Legal | 0 | 0 | 0 | 0 | 0 | 0 | 0 | 0 | 0 | 0 | 0 | 0 |
| Management Fee | 0 | 0 | 0 | 0 | 0 | 0 | 0 | 0 | 0 | 0 | 0 | 0 |
| Repairs | 1500 | 2000 | 1500 | 0 | 0 | 0 | 0 | 0 | 0 | 0 | 0 | 0 |
| Payroll | 0 | 0 | 0 | 0 | 0 | 0 | 0 | 0 | 0 | 0 | 0 | 0 |
| Replacement Reserves | 0 | 0 | 0 | 0 | 0 | 0 | 0 | 0 | 0 | 0 | 0 | 0 |
| TOTAL | 37300 | 37800 | 37300 | 35800 | 35800 | 35800 | 35800 | 35800 | 35800 | 35800 | 35800 | 35800 |

Fig. 2

GRAPHICAL USER INTERFACE AND CONSOLE MANAGEMENT, MODELING, AND ANALYSIS SYSTEM

CROSS REFERENCE TO RELATED APPLICATIONS

This application is a Continuation of application Ser. No. 17/327,727, filed on May 23, 2021.

This application claims the benefit of the filing date of each of U.S. Provisional Application Ser. No. 63/153,087, filed Feb. 24, 2021, U.S. Provisional Application Ser. No. 63/154,565, filed Feb. 26, 2021, U.S. Provisional Application Ser. No. 63/161,742, filed Mar. 16, 2021, U.S. Provisional Application Ser. No. 63/189,223, filed May 16, 2021, and U.S. Provisional Application Ser. No. 63/190,513, filed May 19, 2021.

The disclosures of the foregoing applications are incorporated herein by reference.

TECHNICAL FIELD

This invention relates generally to graphical user interfaces (GUIs) and/or console management and analysis systems.

SUMMARY

Embodiments include a method, system, and computer program product for providing user interactive consoles and management systems performing analysis of, for example, various investments. In accordance with one or more embodiments, a computer implemented method may include a graphical user interface (GUI) and operator console management system. In some embodiments, various analysis and modeling metrics are determined by a software service provider that may be carried out in whole or in part at any of a server-side, by a proxy or middleware, and/or client-side. In some embodiments, user feedback, entries, changes, and the like may be entered and models may be updated and/or recalibrated according to new data. In some embodiments, data may be aggregated from various users to contribute to models and/or modeling metrics.

Other embodiments of this aspect include corresponding computer systems, apparatus, and computer programs recorded on one or more computer storage devices, each configured to perform one or more of the actions of the methods.

The details of one or more embodiments of the subject matter of this specification are set forth in the accompanying drawings and the description below. Other features, aspects, and advantages of the subject matter will become apparent from the description, the drawings, and the claims.

The subject matter described in this specification can be implemented in particular embodiments so as to realize one or more of the following advantages. Some examples of the advantages of the presented technology include new capabilities, speed, efficiency, and security over present systems. In one example, by carrying out given security protocols by a software service provider in the presented technology, modifications to the protocols to adapt to emerging needs can be rapidly implemented and deployed. In another example, the presented technology allows for operator tailoring of investment models, analysis, and protocols.

BRIEF DESCRIPTION OF THE DRAWINGS

FIG. 2 is a general example of a trailing-12 (T12) profit and loss document

DETAILED DESCRIPTION

Figure 1:
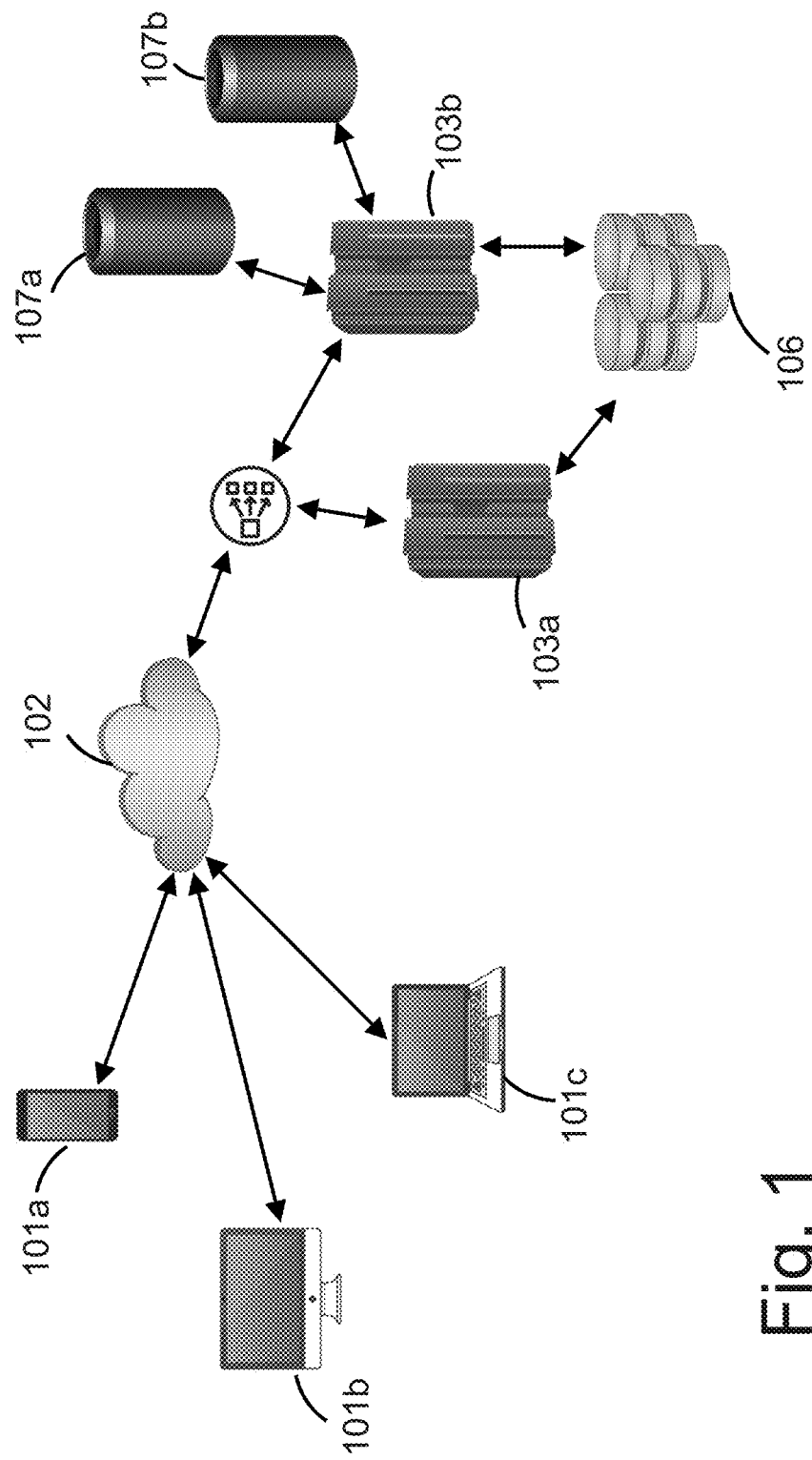
FIG. 1 is a diagram of a general network environment that can be used with graphical user interfaces (GUIs) and/or console management and analysis systems.

Hardware and/or software systems including cloud software systems are becoming more prevalent. Such systems may be used for automation of tasks that are currently manual or laborious. Accordingly, there is a growing need for efficient methods and systems, such as to eliminate more tedious processes.

Acronyms

API—Application Programming Interface

HTTP/HTTPS—Hyper Text Transfer Protocol/Hyper Text Transfer Protocol Secure

ML—Machine Learning

P2P—Peer-to-Peer

REST—Representational State Transfer

TLS/SSL—Transport Layer Security/Secure Sockets Layer

VPC—Virtual Private Cloud

VPN—Virtual Private Network

Terminology

Application Programming Interface

API technologies provide routines, protocols, and tools for building software applications and specifies how software components should interact.

Cloud Computing

Cloud computing is a model that promotes ubiquitous, on-demand network access to shared computing.

Public Keys and Private Keys

Public and private keys are created in pairs for each entity involved in a transmission and encrypt and decrypt information during the initial part of the transmission so that only the sender and recipient of the transmission can decrypt and read the information. Public key is available to everyone while the private key is known only to the creator of the keys.

Software Services

Described in this disclosure are various software services.

A software service may be delivered, or provided by, a third party service, or vendor. The third party service, for example, may be a software service of a vendor. The software service may be hosted at a vendor-owned location, a third party location, or a proxy location, for example.

Software services may utilize any combination of the below components, for example.

Transport Layer Security/Secure Sockets Layer (TLS/SSL)

Transport Layer Security/Secure Sockets Layer (TLS/SSL) connections make use of public and private keys among parties when establishing a connection and secure almost all transmissions over the internet or computer networks, including emails, web browsing, logins, and financial transactions, ensuring that all data that passes between a web server and a browser remains private and secure.

X.509 Certificates

X.509 certificates are digital certificates administered by certificate authorities that use the X.509 PKI standard to verify that a public key belongs to the user, computer, or service identity in the certificate and are used worldwide across public and private sectors.

X.509 Attribute Certificates

X.509 attribute certificates can encode attributes (such as name, date of birth, address, and unique identifier number), are attached cryptographically to the X.509 certificate, and are administered by attribute certificate authorities.

Hyper Text Transfer Protocol

It will be understood that the terms HTTP and HTTPS will be used interchangeably and that use of either term includes either alternative.

Representational State Transfer

Representational state transfer (REST) is a software architectural style that defines a set of constraints to be used for creating Web services. Web services that conform to the REST architectural style, called RESTful Web services, provide interoperability between computer systems on the Internet.

Virtual Private Networks

One element of a software service may be a Virtual Private Network (VPN). A VPN may establish a secure and private tunnel from a network, terminal, or device, for example to another network element such as a vendor service, for example.

Security Groups

One element of a software service may be a security group. A security group, rules may be defined that dictate the allowed inbound and/or outbound traffic to a server, for example. For example, a security rule may specify to allow SSH access, from a particular IP address, on a particular port or port range, and using a particular protocol, such as TCP.

Virtual Private Cloud

One element of a software service may be a Virtual Private Cloud (VPC). A VPC allows isolation of shared cloud resources, for example. In one method, private IP subnets may be assigned to a VPC user that is accompanied by a VPN function or access that secures, by means of authentication and encryption, the user's VPC resources.

Queues

One element of a software service may be a processing queue. For example, the queue may be processed in a first-in-first-out (FIFO) or last-in-first-out (LIFO) order. The queue may collect several processes to be carried out.

Server Architecture

A software service may be hosted on elastic server architecture, in one example. In an elastic architecture, computing resources may be automatically increased or decreased to meet computing needs. Computing thresholds may be preset or configured. When a threshold is exceeded for example, additional computing resources may be allocated.

Serverless Architecture

In another example, a software service may be hosted using serverless architecture. In a serverless architecture, computing resources are allocated as necessary on a per-request basis. After the request is processed, the computing resources are unallocated, or returned.

Data Structures

Various data structures may be used in conjunction with the software services. For example, various data structures may be used alone, or in combination, to store customer data/metadata, transaction data, etc.

Some example data structures include arrays, stacks, queues, linked lists, trees, graphs, tries, and hash tables.

Software Services

A third party vendor or provider may provide virtual currency processing software services. Software may be installed on terminals or via backend/cloud servers, or both.

Other Terminology

Herein a "plurality" refers to "one or more" of an element and does not impose any requirement for more than one element.

Various services may be pipelined, and executed in conjunction, in a non-blocking manner, for example.

Customer relationship management (CRM) and/or web based software or tools are useful for a variety of tasks. New arrangements and/or combinations of web tools or components, for example, can allow new capabilities for solving emerging problems or allowing more efficient handling of current problems and/or tasks in various fields.

One such field relates to real estate web based tools and/or software. Real estate purchases, sales, and deals may include many steps and or tasks. Often, such tasks include the same or similar steps which may be partially or fully automated. One example includes underwriting of multifamily property purchases.

FIG. 1 is a diagram of a general network environment that can be used with the systems and methods described herein. A client (101a-101c), for example, may be in communication through a network 102 with servers of a backend service, 103a or 103b, hosted by a software service provider, for example. The client may send requests through the network 102 to the service 103a or 103b. The service may determine a response using information and data from a datastore 106, for example. The response 105 may be sent to the terminal instructing certain actions, for example. The backend service may be in further communication with third party services, 107a or 107b, for example.

In some embodiments, users, customers, agents, brokers, franchisers, franchisees, and/or service providers may be able to create web based accounts.

Web based and/or web accessible accounts may access one or more databases and or datastores, for example a backend database access via cloud infrastructure described herein. For example, a MySQL database may store user profiles, one or more user IDs or unique identifiers, credentials, and/or details associated with the user. Users may register and/or access/login to user accounts via web based registrations, etc.

In some embodiments, web based account portals and various management GUIs as described herein may be used to manage, analyze, handle, and/or share a real estate deal analysis, such as a multifamily asset purchase analysis.

In some embodiments, a deal or analysis profile may be created. A unique deal or analysis identifier may be assigned and/or stored in a database, for example. Data may be associated with the deal or analysis using, for example, data fields in a database, data tables, etc. Such data may be associated or linked via the unique deal or analysis identifier. Further, a deal or analysis may be linked to a user profile and/or profile identifier. For example, when a deal or analysis profile is created in a user's account, the deal will be linked to a user's unique account identifier.

Data Extraction/Analysis

In some cases, data extraction techniques may be used in order to extract data from, for example, PDF or Excel files such as offering memorandums (OMs), T-12's ("trailing 12"), T-24's, profit & loss (P&L), or rent roll documents, etc. For example, text may be parsed, recognized, and/or extracted from documents using, for example, OCR and/or tags, such as XML tags, metadata or metatags, etc. Data from such documents may also be manually entered into form fields, for example. Additionally, tags associated with fields may be newly created and/or stored to allow efficient access, processing, and for use in calculations, etc.

FIG. 2 is a general example of a trailing-12 (T12) profit and loss document.

A profit and loss document 200 may include, for example, income 201 and expenses 202 for a time period, range, or the like. For example, income items and expense items may be recorded and shown for each month over the course of 12 months. For example, income and expenses may be shown for each month in 2019 beginning in January 2019 (203a) and ending December 2019 (203b).

A total may be calculated for each column, to provide, for example, a total income (201a) and total expenses (202a). Some income items may be losses, in some cases, for example losses for vacancy (201b).

Extracted data may be automatically entered into form fields and/or databases, datastores, etc. associated with a deal or analysis For example, extracted data may be identified as a particular type of data. For example, extracted tags, labels, or identifiers may be used to classify extracted data such as rent collected, or a type of expense, during a particular month and/or year.

Some example data items may include property address(es), property information, income items, expense items, debt service principal and/or interest (for example, debt service costs from bank financing), projected income/expenses, deal/contract profile data items, etc. Data items may be expressed as dollar values, percentages of increase/decrease year-over-year or month-over-month, etc.

Examples of property information may include a number of units, size of units, occupancy of units, etc. For example, a multifamily property may be a 100-unit complex comprised of 50 one bedroom/one bathroom units and 50 two bedroom/one bathroom units.

Example income items may include monthly or yearly rent, utility income, laundry income, etc.

Example expense items may include real estate taxes, insurance, contract services, utility services such as gas/electric/water, legal services, management service fees, repair and maintenance costs, payroll, replacement reserves, etc.

Examples of some expenses items that may be one-time expenses, or expenses that are not expected to recur annually include closing/sale costs to purchase or sell a property such as broker fees, fees to construction managers or contractors, financing fees, lender fees, surveys, seller credits to closing that may be negotiated in a contract, appraisal fees, escrow such as for insurances, repairs, and/or tax, title insurance, attorney fees, finder's fees, underwriting fees, etc.

Examples of projected income/expenses may include projected capital expenditures to renovate units, projected management fees, projected income from utility reimbursements, general miscellaneous income, projected inflation corrections, projected insurance expenses, projected payroll expenses, projected repairs and/or maintenance, projected tax expenses, etc.

Examples of deal and/or contract profile data items may include investor returns such as equity/income splits/payouts at different times such as pre and post refinance and principal/capital return events or sale events, terms or frequencies for payouts, preferred returns, asset management and/or acquisition fees to various investors or parties, etc.

Debt service data may be calculated from, for example, loan terms data that is extracted or entered. For example, an interest rate and loan time period may be determined from data, and a yearly or monthly principal and/or interest payment may be calculated.

Cash flow data may be similarly determined and/or calculated. For example, a monthly or yearly total may be determined by adding all income for the given time period and subtracting all the expenses for that time period. In some embodiments, debt service may be included as an expense, and in other embodiments, debt service may be excluded.

Net operating income data may be calculated similarly for a given time period.

Projection data may be determined and/or entered. For example, a user may enter an annual rent escalator percentage, metric, or value. Similarly, a user may enter an annual expense escalator percentage, metric, or value. Projection data may be used to create a growth model over a given period of time. A growth model, for example, may be useful to provide a model or estimate for returns on investment. For example, a cash return may be calculated according to an initial cash or capital investment that has been entered or determined.

In some embodiments, data currently stored, such as extracted data and/or manually entered data, may be populated into form fields and GUIs to allow a user to correct data displaying in form fields. For example, some extracted data may include errors and may benefit from manual correction.

Figure 3:
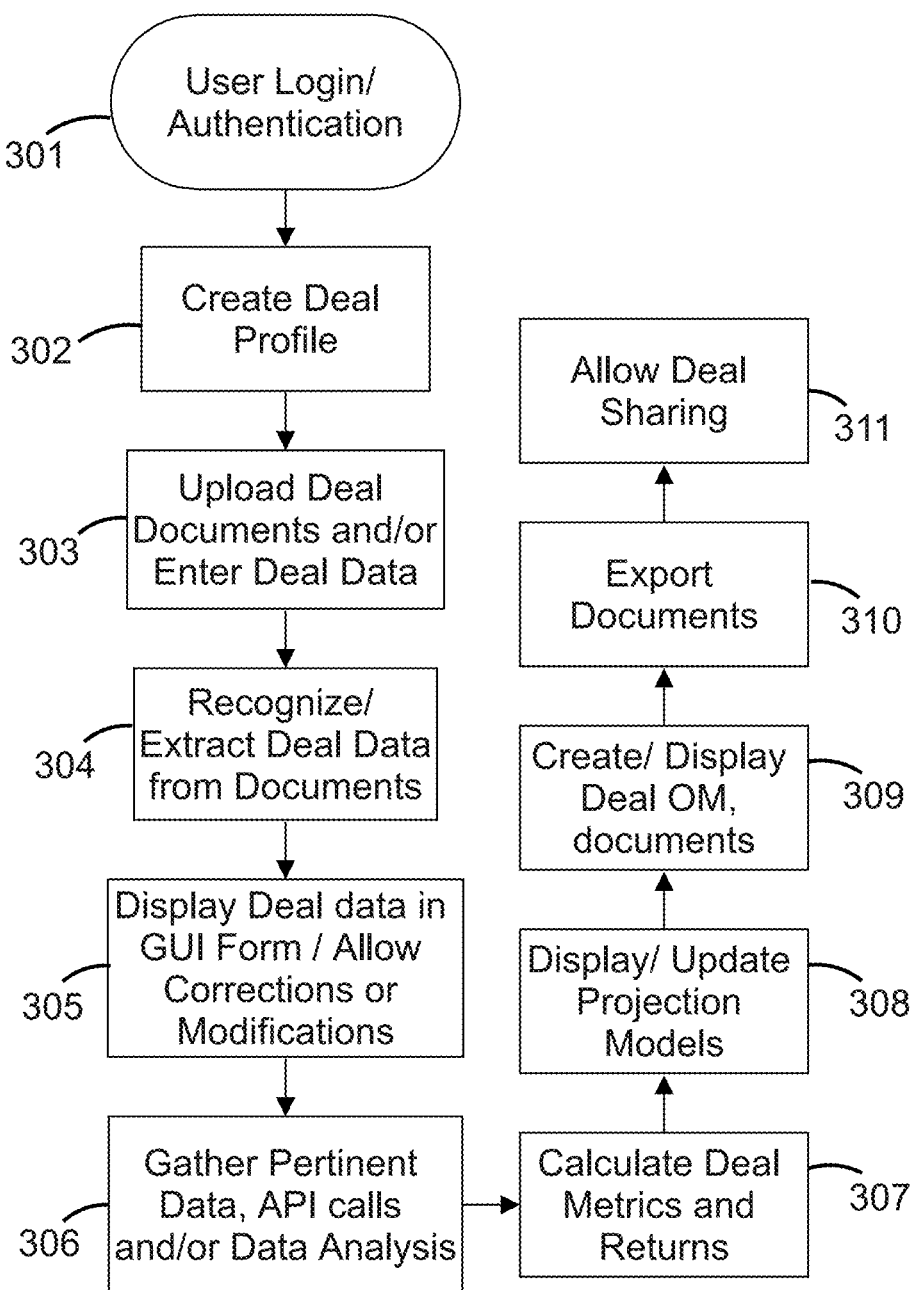
FIG. 3 is a flowchart showing a general deal analysis process

FIG. 3 is a flowchart showing a general deal analysis process.

In some embodiments, a user may access, from a client device, a web-based account, portal, GUI, console, dashboard, etc. by login or password authentication 301, for example.

In some embodiments, a secure session may be established between a software service provider and a client device used by a user. A secure session may be established using a secure socket layer (SSL) or transport layer security (TLS) protocol and/or a secure session is established using a secured connection using a virtual private network (VPN).

In some embodiments, a user may provide login credentials, such as a password or passphrase, biometric credentials such as fingerprint ID or facial recognition data, etc.

In some embodiments, upon verification of login credentials, a user logged in session may be created via, for example, cookies stored in association with the user session, using, for example, JavaScript or PHP variables. The cookies and/or other tokens may be utilized or supplied with payloads during transmissions and exchanges between the web application and server side software services. Payloads may be, for example, JSON encoded data elements. In other embodiments, such a payload/JSON encoded data element may be prepared without the use of cookies.

In some embodiments, a user may be allowed to create a new property, deal, deal profile 302. For example, a user may select an option via a form. Upon selection, an HTIP/HTTPS request including a payload may be created. The payload may include user authentication credentials, session variables and/or tokens, a user identifier or ID, etc. The payload may be encrypted and delivered to a server-side software service by, for example, a JavaScript or AJAX request including the payload such as in the form of a JSON-encoded data element. The software service provider may create, in response, one or more database entries storing property, deal, or deal profile identifiers in association with a user identifier for the creator.

Users granted access to the property, deal, or deal profile (such as by owner/creator permissions and/or shared to permissions) may be allowed to upload documents and/or enter or modify data associated with the property, deal, or deal profile 303. Users may be allowed to specify a document type and/or format. For example, a user ay be allowed to specify a T12 or historical document, rent roll, etc. in format PDF, .png, .jpeg, .doc, .docx, Excel, .xlsx., etc.

Documents may be delivered in a payload as described herein to a server side software service provider. Data items in the documents may be recognized using, for example, optical character recognition (OCR) methods, extracted 304 and entered into relevant data fields in a database or data store in association with the user and/or deal/deal profile using, for example, user or property/deal unique IDs/identifiers.

Data items that have been recognized and stored may be presented to a user with access to the property or deal profile using one or more GUIs and allowed to make corrections or modifications to the data items 305. For example, form elements may be used to present the data items with form fields and descriptors.

Other data items pertinent to the property and/or deal profile may be gathered from other sources 306. For example, API calls can be made to third party software services requesting data.

Based on the data items associated with the property or deal profile, various metrics and/or returns estimates may be calculated 307.

Projection models may be created and/or displayed 308. Property or deal documents, such as offering memorandums (OMs), deal summaries, or investment summaries may be created and/or displayed 309. Deal documents may be shared and/or exported to the user and/or users or parties selected by the user for sharing 311. For example, a user may be allowed to instruct that the documents may be emailed to a particular email address.

Figure 4A:
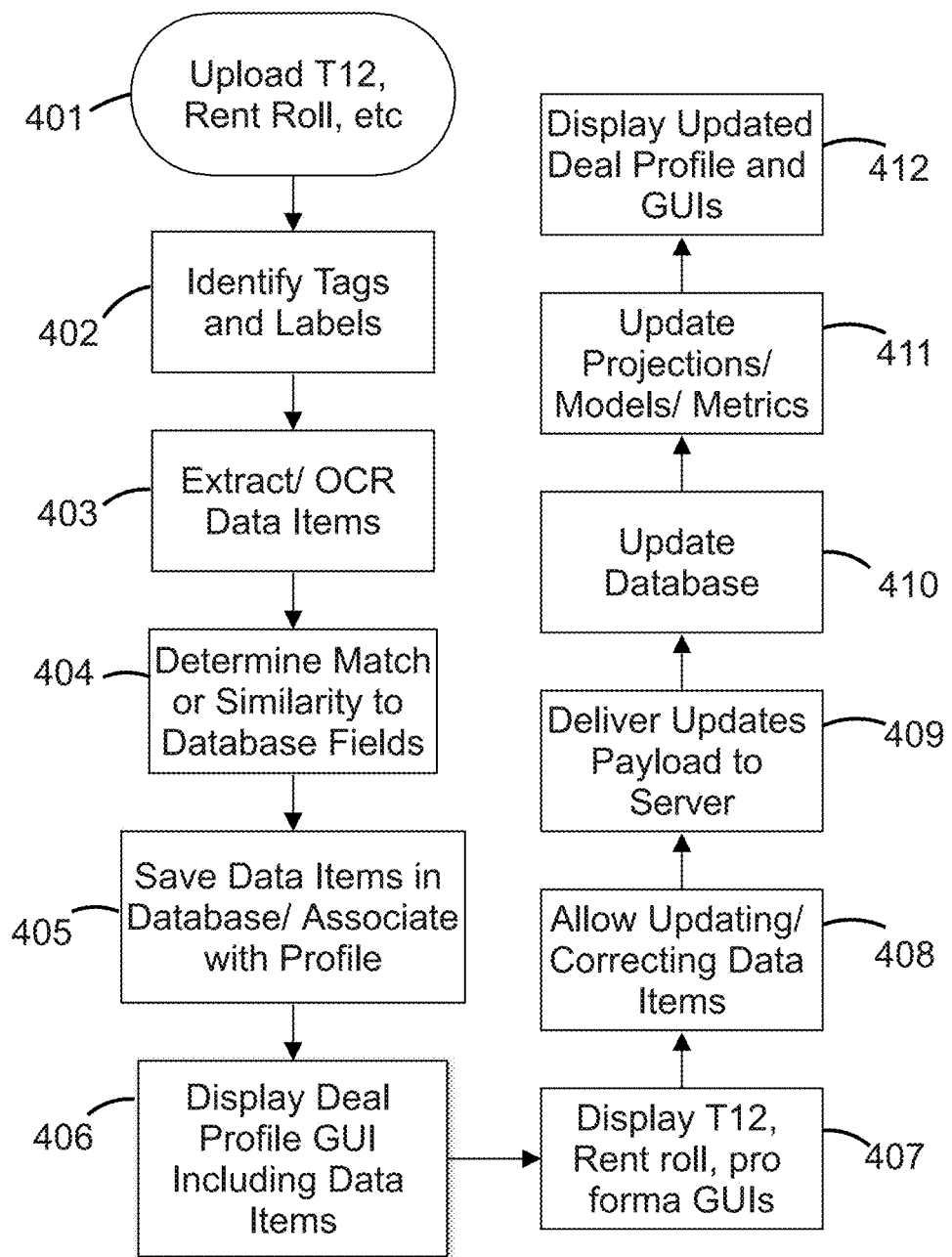
FIG. 4A is a flowchart showing a general deal data handling process

FIG. 4A is a flowchart showing a general deal data handling process.

In some embodiments, users may upload documents such as T12's, rent rolls, historicals, etc., 401 associated with a multifamily property for sale, for example.

In some embodiments, uploaded documents may be delivered and/or stored from a client to a database in a server side system. The system may, at a client side, at a middle proxy, or at a server side perform a processing of the documents. Processing may include a data extraction step wherein tags and/or labels are identified 402 in the documents using, for example, optical character recognition (OCR) and tags, labels, and associated data field items may be extracted 403.

Based on identified tags and/or labels, similar or matching fields in a database may be identified. In one example, a property management fee of 5% for year 2012 may be listed in a historical for a multifamily property for sale. The system may identify a tag or label such as "management fee" or "property management fee" and the associated data field containing the value "5%". The system may identify that this tag/label most closely matches a database field for "management_fees" 404 and an associated field "year". The system may populate and save 405 the database fields "management fees" with "5" or "0.05" (depending on the field format) and year with "2012", for example, associated with a deal profile ID for the uploaded documents.

In some embodiments, one or more deal profile GUIs or GUIs associated with a deal or deal profile may be displayed 406. Such GUIs may include extracted data items. For example, a historicals GUI may be displayed in association with a deal for which documents have been uploaded as described above. In one example, the "management_fees" field and associated "year" field may be accessed and/or queried. The data entries determined by the queries may be displayed in the historicals GUI. Similarly, T12, rent roll, and or pro forma GUIs may be created and/or displayed 407 according to data stored in associated with the deal profile.

In some embodiments, users may be allowed to update or correct data items 408 in the aforementioned GUIs. For example, the GUIs may be comprised of form fields for one or more of the data items. Upon a change, update, or correction using a form field, a payload may be delivered to the server side 409. A payload may be delivered in JSON format, for example. A payload may include, for example, one or more data items which have been updated, an identifier for the data field, and/or an associated identifier such as a deal profile ID. A payload may be encrypted during delivery and decrypted on the server side. A database storing the associated data may be updated 410 according to the delivered data.

Once database data is updated, new models may be created and/or delivered according to the updated data 411. In this way, projections and models are up to date and/or realtime, reflecting the most up to date data. Similarly, updated deal profiles and/or GUIs may be displayed 412.

Figure 4B:
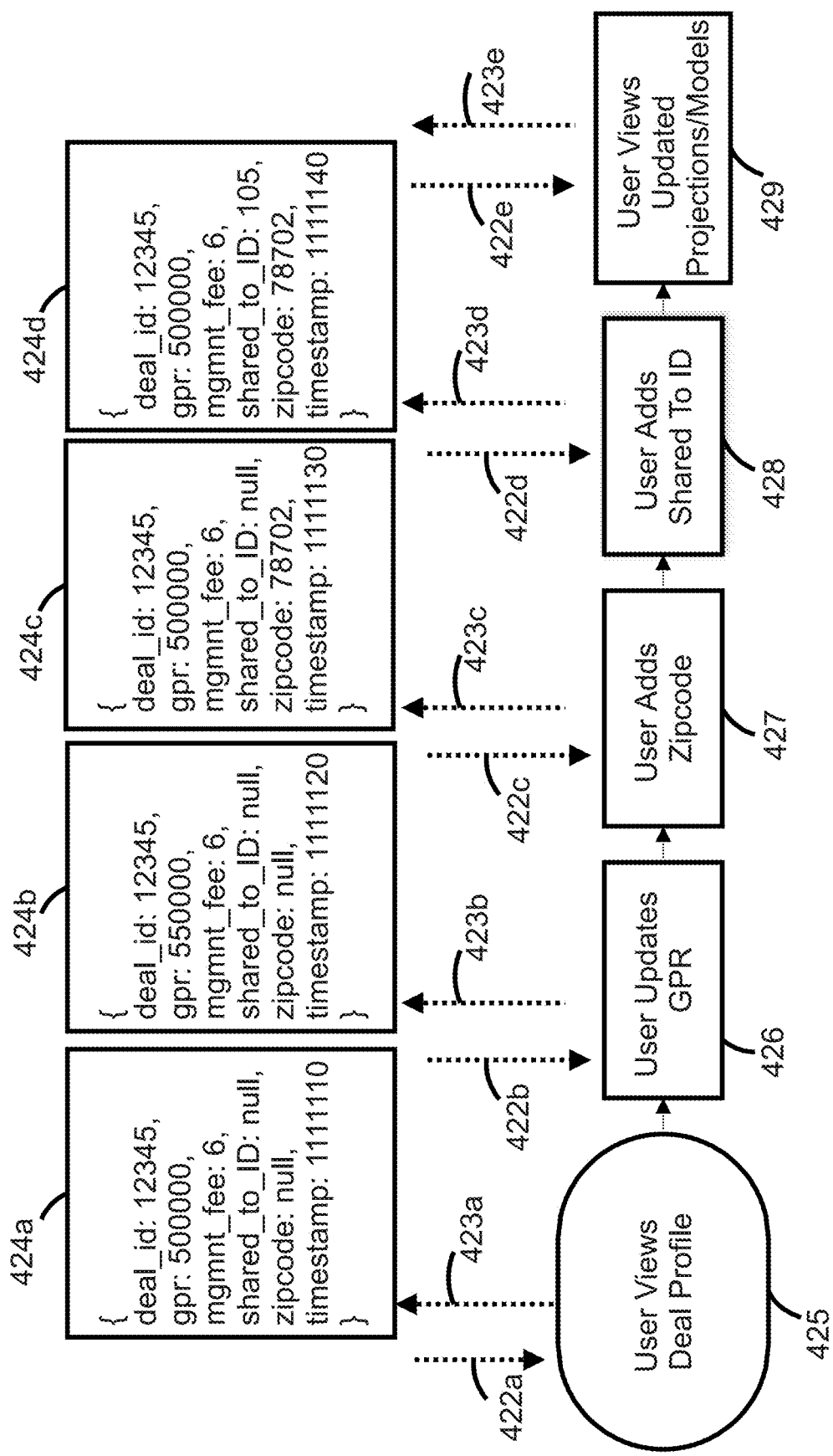
FIG. 4B is a diagram showing a general deal data handling/updating process

FIG. 4B is a diagram showing a general deal data handling/updating process.

An example sequence is provided. It will be understood that the given steps are optional and/or may be rearranged. A user may access or view a deal profile 425.

The user may be presented with one or more user interfaces or GUIs.

During the user interactions with the one or more GUIs, queries/requests (422a-422e) and updates (423a-423e) may be made between the client and a software service. The queries and updates may handle and/or update a database and/or state (424a-424d) associated with the deal profile. It will be understood that data elements 424a-424d could include other parameters as described herein. Additionally, such data elements could include, for example, API keys and/or secret keys.

An initial state for a deal profile may be requested with some data items, for example. The initial state may be requested 423a before or during the user's initial updates, for example, and communicated from a software service provider via a secure session such as via a VPN and/or encrypted connection. The query may be communicated from the software service provider as an encrypted payload that is decrypted at the client. For example, a JSON data element may be created or prepared by the software service provider. The data element may be encrypted and delivered to the client.

After the user's selection to update GPR, for example, an update for the GPR in the deal profile state may be communicated to a software service provider via a secure session via a VPN and/or encrypted connection. The update may include the delta or changes to the initial or current deal profile state. The update may be communicated to the software service provider as an encrypted payload. For example, a JSON data element may be created or prepared at the client. The data element may be encrypted and delivered to the software service provider 423b. The software service provider may decrypt the payload to reveal a decrypted payload 424b and update the deal profile state, for example by updating a database or datastore.

The current deal profile state may be queried or requested 422c before or during the user next update 427, for example and communicated from a software service provider via a secure session via a VPN and/or encrypted connection. The query may be communicated from the software service provider as an encrypted payload that is decrypted at the client. For example, a JSON data element may be created or prepared by the software service provider. The data element may be encrypted and delivered to the client.

The user may update or add a shared to ID, for example, 428 at the client, to identify a user to allow sharing of the deal profile.

After the user's selection to update or add a shared to ID, for example, an update for the shared_to_ID in the deal profile state may be communicated to a software service provider via a secure session via a VPN and/or encrypted connection. The update may include the delta or changes to the initial or current deal profile state. The update may be communicated to the software service provider as an encrypted payload. For example, a JSON data element may be created or prepared at the client. The data element may be encrypted and delivered to the software service provider 423d. The software service provider may decrypt the payload to reveal a decrypted payload 424d and update the deal profile state, for example by updating a database or datastore.

Figure 5:
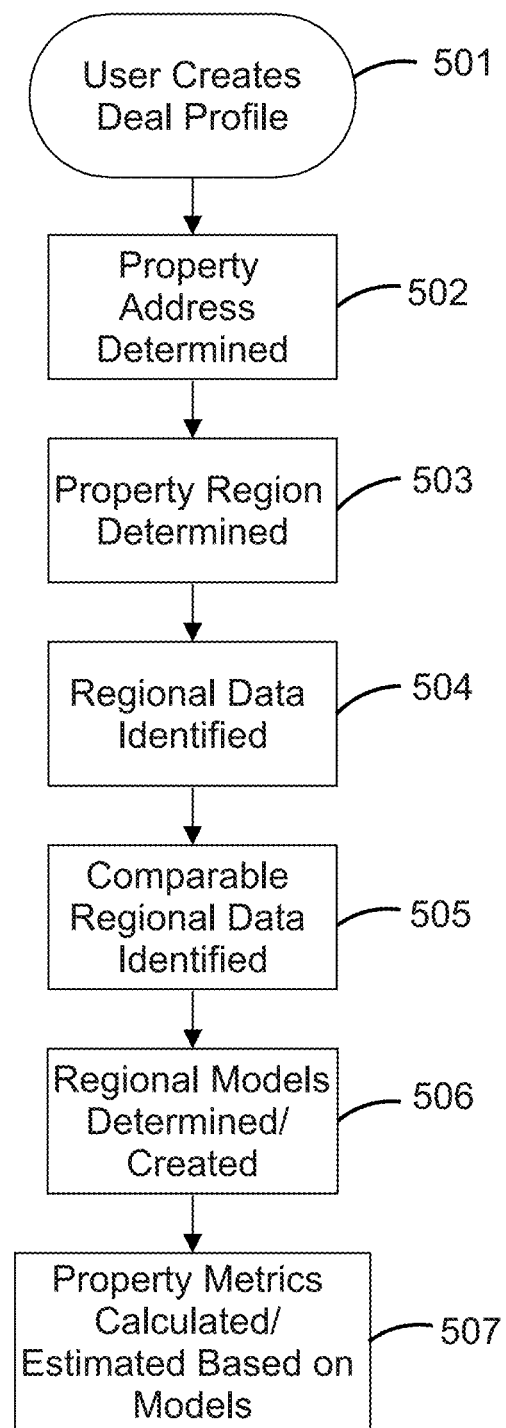
FIG. 5 is a flowchart showing a general modeling process.

FIG. 5 is a flowchart showing a general modeling process.

In some embodiments, tailored or relevant regional models may be created using aggregated data from various deal profiles, for example.

In one example, a user may create a deal profile 501. The deal profile may include, or be updated to include, a property address 502. In some embodiments, a geolocation action may be used to determine a property address and/or latitude and longitude, for example. A property region may be determined 503 based on the property address or parts of the property address or geolocation. In one example, a property region may be a zipcode in which the property address is located.

Once a region is determined, identified, or selected, relevant data from deal profiles within the region may be identified 504. This regional or comparables data 505 applicable to the deal profile may be used to create relevant regional models 506. Property metrics may be calculated and/or estimated 507 based, at least in part, on regional data. In one example, all recent sales in a zipcode may be used to determine an average market price per square foot for similar properties, which may, in turn, be used to create a sales price model for a deal profile. For example, the deal profile may include a total square footage, which may be multiplied by the determined average market price per square foot for similar properties.

Pro Forma

A "pro forma" may be entered, created, updated, and/or produced using, for example, any of the data described herein.

Pro forma financial statements are financial reports issued by an entity, using assumptions or hypothetical conditions about events that may have occurred in the past or which may occur in the future. These statements may be used to present a view of corporate results to outsiders, perhaps as part of an investment or lending proposal. A pro forma may be shared with investors, lenders, banks, etc. For example, account access or permissions may be set by a user or creator of a deal profile that allows access or sharing of a pro forma for a deal. In one example, a lender or investor may create an account, and a pro forma may be shared with the lender or investor account by setting permissions. In other examples, shared documents such as a pro forma may be sent to an email address selected and/or entered.

In some embodiments, historical data such as in a T-12 may be entered. A pro forma may take into account assumptions such as growth increases due to, for example, projected rental increases. The growth may be expressed as a percentage of the previous year's income. Thus, a year-over-year growth may be calculated in some embodiments. Projected income and expenses may be factored into assumptions of growth or decline. Various models then, based on various assumptions or projections, may be developed, as described herein.

Modeling

In some embodiments, models such as projection models representing, for example, investment returns may be determined, calculated, or created. For example, parameters may be used to calculate a periodic return on a capital investment.

Income and expenses may be calculated for one or more time periods, such as for each year, taking into account a variety of factors. Some factors may include:

1. tax rates acquired by manual entry, data extraction, or automated means such as web scraping and/or API calls to, for example, tax authorities or API accessible data sets providing tax rates for various geographic locations, zipcodes, etc;
2. tax rate projections which may be calculated or determined by, for example, automated trend determinations based on historical tax increases and/or changes for a particular tax locale or area;
3. management fees acquired by manual entry, data extraction, or automated means such as web scraping and/or API calls to, for example, API accessible data sets providing management rates for various geographic locations, zipcodes, etc;
4. management fee projections which may be calculated or determined by, for example, automated trend determinations based on historical management fee increases and/or changes for a particular locale or area;
5. growth rate estimations and/or metrics, variables, or parameters acquired by manual entry, data extraction, or automated means such as web scraping and/or API calls to, for example, API accessible data sets providing growth rates for various geographic locations, zipcodes, etc;
6. growth rate projections which may be calculated or determined by, for example, automated trend determinations based on historical growth rates and/or changes for a particular locale or area;
7. optimization estimations and/or metrics, variables, or parameters such as potential rent increases acquired by manual entry, data extraction, or automated means such as web scraping and/or API calls to, for example, API accessible data sets providing data such as average rent per square foot for various geographic locations, zipcodes, etc and/or for similar properties;
8. optimization projections which may be calculated or determined by, for example, automated trend determinations based on historical optimization rates and/or changes for a particular locale or area;
9. utility cost/expense estimations and/or metrics, variables, or parameters acquired by manual entry, data extraction, or automated means such as web scraping and/or API calls to, for example, API accessible data sets providing data such as average utility use per square for various geographic locations, zipcodes, etc and/or for similar properties;

10. utility cost/expense projections which may be calculated or determined by, for example, automated trend determinations based on historical utility cost/expense rates and/or changes for a particular locale or area;

11. income and expense items described elsewhere herein;

One or more of the given factors, for example, may be taken into account to create one or more projections. Projections may be presented in charts, tables, graphs, illustrations, etc.

In some embodiments, one or more curves may be displayed incorporating various factors. This can allow easy visualization and comparison of projections using various metrics, parameters, factors as above, or scenarios. For example, conservative, moderate, and/or aggressive projections may be compared. In one example, a conservative projection may incorporate a more conservative growth metric or projection than an aggressive projection.

In some embodiments, factors or parameters may be updated. Upon updating, projections may be recalculated or adjusted to reflect the updates and visualizations may be updated accordingly so that a user may visualize the update's effects on projected outcomes, such as return on investment outcomes.

Figure 6:
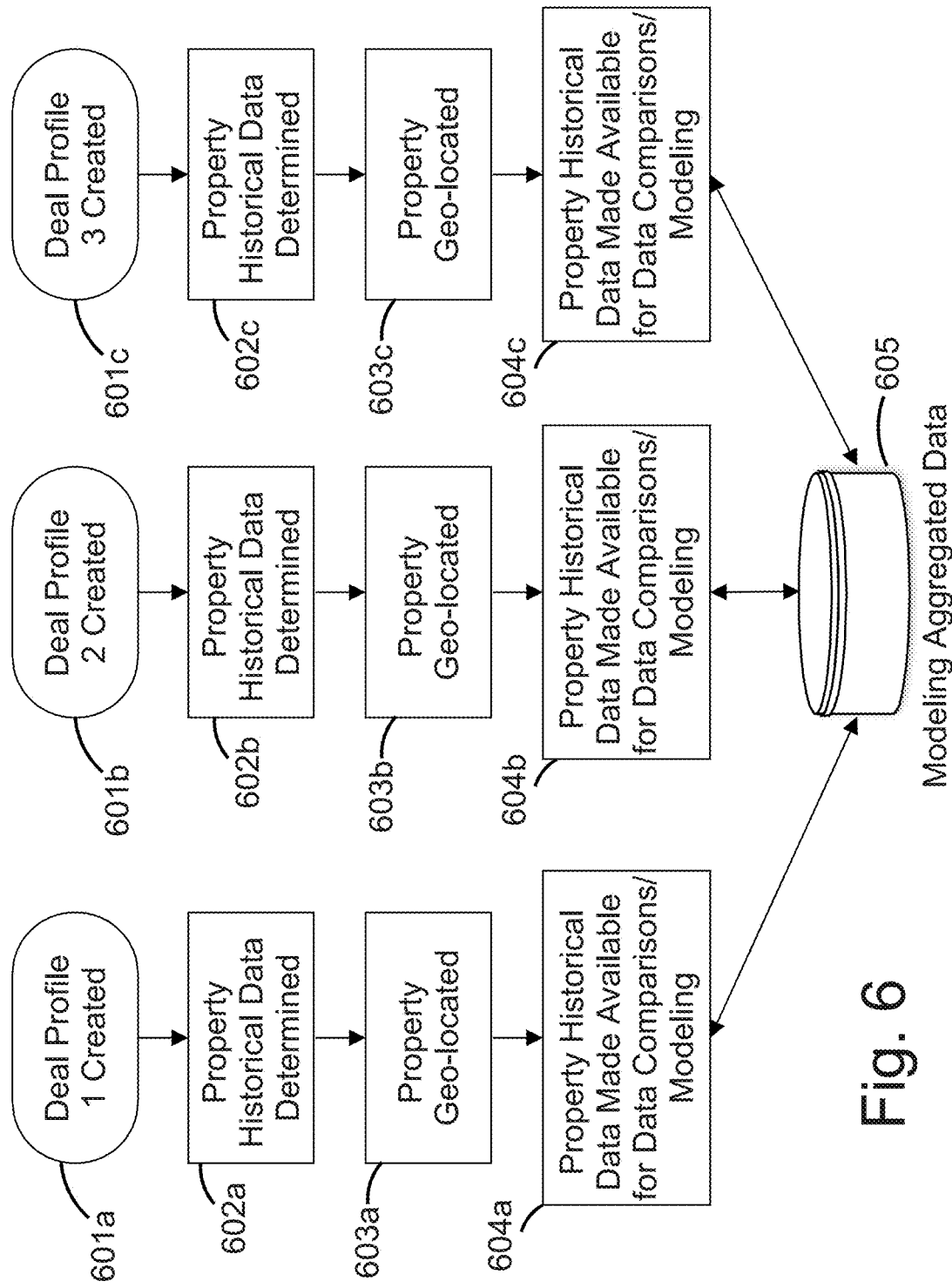
FIG. 6 is a diagram showing a general data aggregation process.

FIG. 6 is a diagram showing a general data aggregation process.

In some embodiments, data may be aggregated from, for example, deal profiles entered and/or created by users (601a-601c). Aggregated data may be used for modeling and projection processes for similar properties. For example, comparable rent-per-square foot values may be determined for a property.

As described herein, users may enter historical data for properties, or historical data may be otherwise identified (602a-602c).

Addresses and/or locations (ie., latitudes and longitudes) of properties may be entered and/or determined by, for example, geolocation such as via an API call to a third party service (603a-603c).

For example, data including the property address or part of a property address may be forwarded from a software service provider to a third party software service provider in the form of an HTTP(S) request to an API endpoint, for example, a URL, of the third party software service provider, and responses may be returned. HTTP methods used may include, for example GET, HEAD, POST, PUT, PATCH, DELETE, CONNECT, OPTIONS and TRACE. The HTTP requests and/or responses may include application/json content type, wherein data may be JSON encoded data. Additionally HTTP(S) status codes may be used to indicate success and failure.

An HTTP(S) request to an API endpoint may require authentication. For example, the API may conform to a Representational State Transfer (REST) style. For example, an API key, token, access key, and/or secret key may be provided by the third party software service to the core service provider or vendor. Keys may be included in HTTP (S) headers, for example, for every HTTP(S) request. Keys may be in the form of a string, such as a base64 encoded string, for example. Similarly, a timestamp may be included in HTTP(S) headers for HTTP(S) requests to an API endpoint. A Hash-based Message Authentication Code may be computed using a hash function, for example, a SHA256 hash function.

An HTTP(S) request to an API endpoint may include a payload. The request and payload may be formatted as any HTTP(S) request. For example, a request may be made using various programming languages or combinations of programming languages, such as CURL, Ruby, Python, Node, PHP, Java, and/or JSON.

The payload may include property address data associated with a deal profile. The payload may be formatted in HTML, XML, JSON, or another format.

The service provider may return, to the software service provider, a result that may include additional address data, location data, or map data. The result may include information to allow the display of a map wherein the map can include, for example, an icon representing the address. The result may be stored in association with the account, and the date and/or time of the request and/or retrieval of the result may be also stored. The result may include a payload formatted in HTML, XML, JSON, or another format.

The determined property historical data, along with qualities such as property location or region, may be made available for modeling, projecting, etc. (604a-604c). The data and qualities may be aggregated and/or stored 605.

Figure 7:
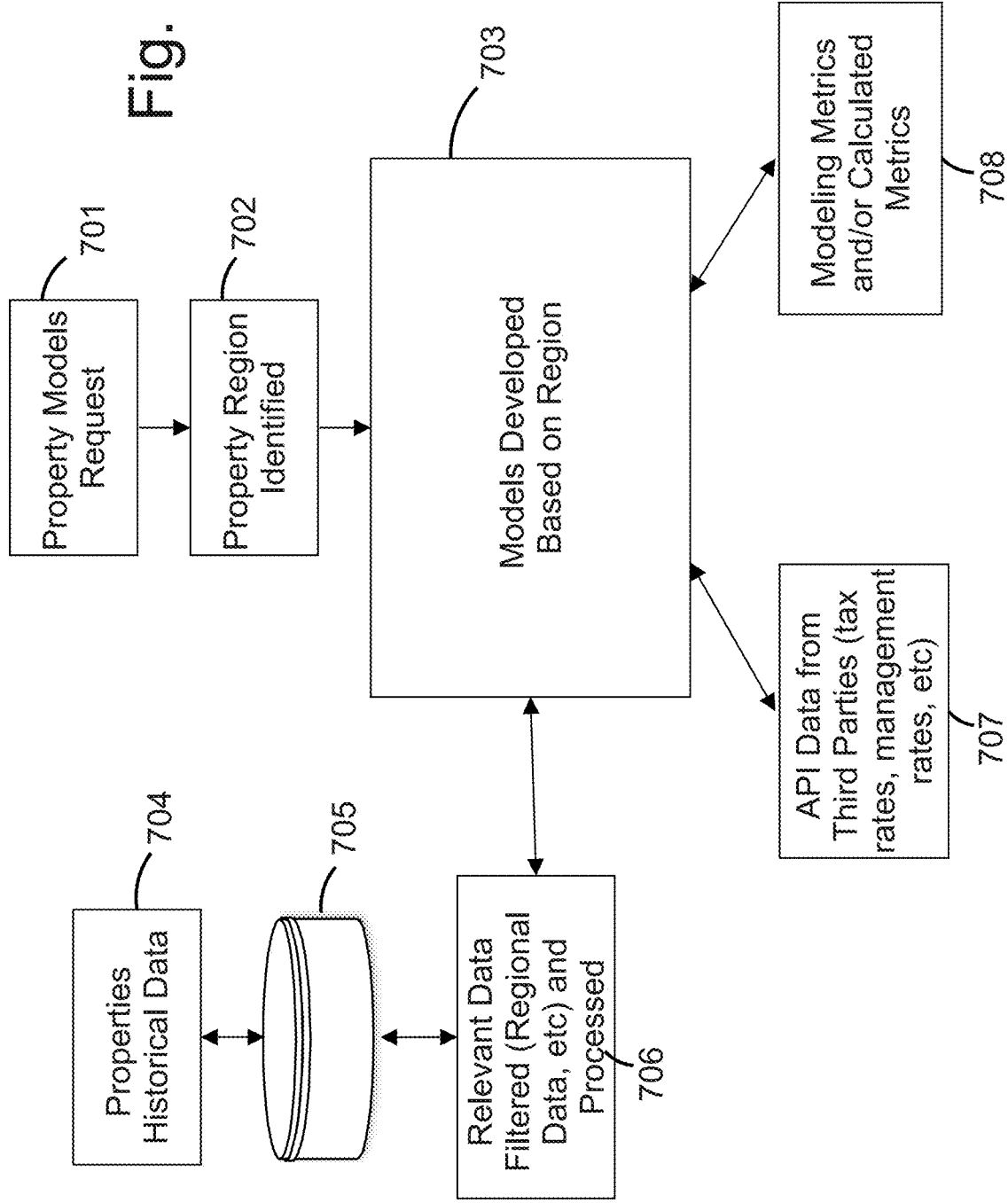
FIG. 7 is a diagram showing a general modeling process.

FIG. 7 is a diagram showing a general modeling process.

In some embodiments, a user may request modeling data associated with a property 701.

The system may determine qualities associated with the property to identify data from an aggregated data store. In one example, a property region may be determined for the property, such as the property zipcode, county, city, and/or state 702. Other examples qualities can include any property data or deal profile data such as square footage, size, acreage, number of units, age or year built, NOI, rental income or GPR, management fees, taxes, etc.

Historical and other property data 704 may be accessed from a datastore 705 wherein the data has been aggregated, for example.

Based on one or more of the qualities of the property for which modeling data is requested, relevant data may be queried, selected, filtered, and/or processed from the data store 706.

Examples of the processing may include determining averages or trends for particular metrics associated with the qualities. For example, an average rent per square foot may be calculated for properties selected that match or are determined to be similar to the select qualities.

Other data may be gathered and or utilized for development of models 703, in addition to the above.

In some embodiments, API calls may be made to third party software service providers, for example, to determine metrics such as area or regional tax rates, management rates, etc. 707.

Other modeling metrics may be calculated 708 from, for example, the above data. In one example, an average NOI may be determined for an applicable region or region of interest.

Since the above data items may be changing with time, models are dynamic and evolve with market changes, etc.

Some Examples are provided herein.

Example 1

In a first example, a projection model is calculated for a multifamily property purchase/deal. In this example, an initial capital investment of $500,000 is entered or determined using, for example, the aforementioned extraction or data entry techniques. The capital investment may be, in some embodiments, an aggregate of capital invested from various parties, for example, investors.

Historical data, as described herein, may be imported and/or entered.

Other data such as inputs, parameters, or metrics may be additionally imported, determined by automated means such as by API calls as provided herein, or entered by a user.

Example data may include a loan rate. A loan rate may, for example, be determined by an API call to a data provider or software service estimating current loan rates for multifamily properties or by user input. Similarly, a loan period, and other loan terms such as in interest-only period, may be determined or input.

Based on the loan rate, loan period, and/or loan terms, other costs and/or an amortization may be calculated. For example, a monthly or yearly principal payment may be calculated and a monthly or yearly interest payment may be calculated, incorporating the loan terms. For example, during an interest-only payment period, a calculation may exclude a principal payment.

Metrics, Parameters, Key Values, and Inferences

Based on data entered or ascertained, various metrics, parameters, or key values may be calculated, determined, or inferred.

In some examples, a total economic vacancy may be determined. In some examples, a total economic vacancy includes the sum of one or more of a loss to lease, a vacancy loss, and concessions/bad debts. A total economic vacancy may be expressed as a percentage of some or all of income for a property, such as a percentage of a gross potential rental income (GPR). A GPR may be determined from historical data for a property or may be projected from factors such as market trends and/or rates.

In some examples, a total operating income may be determined. In some examples, one or more income items described herein are summed to determine total operating income. Thus, a total operating income (TOI) variable may be calculated by according to an equation:

$$TOI = i_1 + i_2 \ldots i_x$$

or $$TOI = \sum_{1}^{x} i_x$$

In some examples, a total operating expense may be determined. In some examples, one or more expense items described herein are summed to determine total operating expense. Thus, a total operating expense (TOE) variable may be calculated by according to an equation:

$$TOE = e_1 + e_2 \ldots e_x$$

or $$TOE = \sum_{1}^{x} e_x$$

In some examples, other non-operating income or non-operating expenses may be present. In some examples, asset management fees may be paid to managers of an investment, and capital reserves may be paid to a reserve account. Thus, in some examples, a total expense value or variable may be calculated or determined including both operating and non-operating expenses according to an equation:

$$TE = \sum_{1}^{x} e_x + \sum_{1}^{y} noe_y$$

In some examples, debt service expenses associated with bank loans, private loans, or mortgages may be present for a property investment proposal. In some examples, principal and interest payments/expenses may be determined or calculated for a period, or several periods, from an amortization of a loan proposal using loan variables such as a loan rate and loan term.

Thus, in some examples, a total expense value or variable may be calculated or determined including both operating, non-operating, and debt service expenses according to an equation:

$$TE = \sum_{1}^{x} e_x + \sum_{1}^{y} noe_y + \sum_{1}^{z} ds_z$$

In some examples, a net operating income value or variable may be determined by subtracting total operating expenses and/or total expenses from total operating income and/or total income according to an equation:

NOI=TOI−TOE or according to an equation:

NOI=TOI−TE

In some examples, an NOI may be determined according to an equation:

$$NOI = \sum_{1}^{x} i_x - \sum_{1}^{x} e_x$$

In other examples, the total expenses used in an NOI calculation may include debt service expenses.

In some examples, a debt service coverage ratio (DSCR) value or variable may be calculated or determined. In some examples a DSCR may be determined according to an equation:

DSCR=NOI/ds

In some examples, a cash on cash (CoC) value or variable may be calculated or determined. In some examples a CoC may be determined according to an equation:

CoC=net cash flow/cash or capital invested

Example embodiments are provided:

It will be understood that any of the given elements, steps, etc. in the given embodiments are optional and or reorderable, and provided for example embodiment purposes only.

Embodiment 1

A system comprising:
at least one memory;
one or more processors in communication with the memory;
at least one database or data store;
the system configured for:
receiving a first authentication request to access to a first user account portal, dashboard, or console that allows entry, selecting, or updating of data;
wherein the first authentication request comprises:
a first HTTP/HTTPS request, the first HTTP/HTTPS request comprising a first payload, wherein:

the first payload comprises, at least:
a JSON-encoded first user credentials;
decoding the JSON-encoded first user credentials to produce decoded first user credentials;
verifying the decoded first user credentials;
in response to the verifying the decoded first user credentials, setting or creating a first secure user session, wherein the setting or creating a first user session comprises setting or creating a first session value or variable;
delivering, in a first HTTP/HTTPS response, a second payload to the client
the second payload comprising:
the first session value or variable;
allowing or causing storing of the first session value or variable in a cookie in a client side web browser;
allowing, during the first secure user session, access to the first user account portal, dashboard, or console that allows, using a graphical user interface (GUI), entry, selecting, or updating of first data associated with a multifamily property;

Embodiment 2

The system of Embodiment 1, further configured for:
receiving, during the first secure user session, first information associated with a first entry, selection, or update made in the first user account portal, dashboard, or console, wherein the receiving first information associated with a first entry, selection, or update made in the first user account portal, dashboard, or console comprises:
receiving a second HTTP/HTTPS request, the second HTTP/HTTPS request comprising a third payload, wherein:
the third payload comprises, at least:
a JSON-encoded first information;

Embodiment 3

The system of Embodiment 2, further configured for:
performing a first processing comprising:
decoding, by the software service provider and/or at a server, the third payload to produce a decoded third payload;
determining, by the software service provider and/or at a server, at least two values using the decoded third payload;

Embodiment 4

The system of Embodiment 3, further configured for:
delivering, in a second HTTP/HTTPS response, by the software service provider and/or a server, a fourth payload to the client
the fourth payload comprising:
the at least two values;

Embodiment 5

The system of Embodiment 4, further configured for:
displaying, using the graphical user interface (GUI), the at least two values;

Embodiment 6

The system of Embodiment 5:
wherein first data comprises, at least:
one or more historical expense items;
one or more historical income items;
one or more historical rental income items;
one or more unit type or floorplan items;
one or more property tax items;
one or more growth parameters or projections; and/or
one or more transaction costs or closing costs items;

Embodiment 7

The system of Embodiment 5, further configured for:
wherein the receiving first information associated with a first entry, selection, or update made in the first user account portal, dashboard, or console comprises:
receiving one or more documents uploaded via the GUI;

Embodiment 8

The system of Embodiment 7, further configured for:
performing a second processing, by the software service provider and/or at a server, of the one or more documents, wherein the first processing comprises:
extracting or recognizing one or more values contained in the document;
storing the one or more values in the at least one database or data store;
determining a standard deviation associated with the one or more values;
identifying at least one of the one or more data values as an outlier using the standard deviation;

Embodiment 9

The system of Embodiment 2, further configured for:
wherein the first information includes location information;
performing a first processing, by the software service provider and/or at a server, of the first information, wherein the first processing comprises:
determining a first region associated with the first information;

Embodiment 10

The system of Embodiment 9, further configured for:
identifying a first dataset stored in the at least one database or datastore, wherein the identifying a first dataset stored in the at least one database or datastore comprises:
querying the at least one database or datastore to identify data associated with the first region;

Embodiment 11

The system of Embodiment 10:
wherein the region is at least partially determined based on one or more census tracts.

Embodiment 12

The system of Embodiment 11:
wherein the location information comprises information associated with a location within the one or more census tracts.

Embodiment 13

The system of Embodiment 12:
wherein the region is at least partially determined based on one or more zipcodes.

Embodiment 14

The system of Embodiment 13:
wherein the location information comprises information associated with a location within the one or more zipcodes.

Embodiment 15

The system of Embodiment 1:
wherein first data comprises, at least:
  one or more historical expense items;
  one or more historical income items;
  one or more historical rental income items;
  one or more unit type or floorplan items;
  one or more property tax items;
  one or more growth parameters or projections; and/or
  one or more transaction costs or closing costs items;

Embodiment 16

The system of Embodiment 5:
wherein the determining at least two values using the third payload comprises:
  determining or calculating a net operating income;
  determining or calculating a remaining investor capital value for a first year;
  determining or calculating an income split;
  determining or calculating an income split after investors exit;
  determining or calculating a cash on cash;
  determining or calculating a partners income value; and/or
  determining or calculating a projected value for distribution income;

Embodiment 17

The system of Embodiment 5, further configured for:
displaying, during the first secure user session, using the graphical user interface (GUI) a projection or pro forma model;

Embodiment 18

The system of Embodiment 12:
wherein the projection or pro forma model is based, at least in part, on the first dataset;

Embodiment 19

The system of Embodiment 14:
wherein the projection or pro forma model is based, at least in part, on the first dataset;

Embodiment 20

The system of Embodiment 16, further configured for:
determining a return value for a future period by, at least in part, deducting calculated expenses from calculated income, wherein calculated expenses is a function of historical expenses and calculated income is a function;

Embodiment 21 is a system, the system comprising one or more components and configured to perform actions as described below:
A system:
  the system comprising:
    one or more processors;
    one or more computer readable media;
    one or more servers;
    one or more load balancers;
  the system configured for:
    routing web traffic to one or more of the one or more servers using the one or more load balancers;
    creating a first user account for a first user, by a software service provider, wherein creating the first user account comprises:
      creating, by the software service provider, a first user account identifier for the first user;
      storing, by the software service provider, in association with the first user account, the first user account identifier in the one or more databases and/or data storage devices;
      associating, by the software service provider, login credentials with the first user; and
      storing, by the software service provider, the login credentials in the one or more data storage devices;
    receiving an authentication request to access the first user account, wherein:
      the authentication request is received via a first HTTP/HTTPS request, the first HTTP/HTTPS request including the login credentials;
    authenticating the authentication request, wherein the authenticating comprises:
      verifying the login credentials;
    in response to the authenticating, allowing access to a first user account portal allowing selections or updates, wherein the first user account portal comprises:
      a first set of one or more graphical user interfaces (GUIs);
    wherein, the first set of GUIs allows:
      creation or addition of a first element, data, and/or information comprising a first item, first profile, and/or first property and/or deal and/or deal profile using selection, actuation, and/or clicking of a displayed button, dropdown, icon, option, and/or GUI element;
    wherein the first element, data, and/or information comprising a first item, first profile, and/or first property and/or deal comprises first property data;
    wherein the first property data comprises:
      one or more property addresses comprising at least a first property address;
      property information associated with the one or more properties;
      one or more income elements associated with the one or more properties;

one or more expense elements associated with the one or more properties;
one or more projected income elements associated with the one or more properties;
one or more projected expense elements associated with the one or more properties;
one or more deal or contract profile data item elements associated with the one or more properties;
receiving a request to create or add a property or first deal profile;
wherein the request is a first HTTP/HTTPS request;
performing a first processing of the first option selection, wherein performing the first processing of the first option selection comprises:
receiving, by the software service provider, an encrypted first payload;
wherein the encrypted first payload is produced by encrypting a first payload, the first payload produced by the client, and wherein the first payload comprises information associated with the first request to create a first deal profile and/or the first element, data, and/or information;
wherein the encrypted first payload is communicated to the software service provider from the client during the secure session using the secured connection;
identifying, by the software service provider, an IP address associated with the VPN;
allowing, by software service provider, traffic from the VPN based on the IP address;
decrypting, by the software service provider, the encrypted first payload;
creating and/or storing a first entry, in one or more databases or data storage devices, a first entry associated with the first deal profile, wherein the creating and/or storing comprises:
associating at least an identifier with the first entry;
presenting or displaying at least some of the first property data in the first set of GUIs, wherein the displaying of at least some of the first property data may be in one or more form fields;
allowing entry, editing, modification, and/or updating of the first property data in the one or more form fields;
in response to the entry, editing, modification, and/or updating:
receiving a request to update the first deal profile;
wherein the request is a second HTTP/HTTPS request;
performing a second processing of the second request comprising:
receiving, by the software service provider, an encrypted second payload;
wherein the encrypted second payload is produced by encrypting a second payload, the second payload produced by the client, and wherein the second payload comprises information associated with the first request to update the first deal profile and/or the first element, data, and/or information;
wherein the encrypted second payload is communicated to the software service provider from the client during the secure session using the secured connection;
identifying, by the software service provider, an IP address associated with the VPN;
allowing, by software service provider, traffic from the VPN based on the IP address;

decrypting, by the software service provider, the encrypted second payload;
allowing upload of one or more documents wherein:
the documents may be in any format, including, for example, PDF, image, text, Word document and/or any combination of the aforementioned documents;
the documents may include T3, T6, T12, T24, rent roll, OM, and/or P&L documents;
sending, by the client, a request to a server of the one or more servers, wherein the request delivers at least some of the data associated with the documents to the server;
receiving a request to upload the documents, store the documents, update the first deal profile, and/or incorporate or associated at least some of the data associated with the documents with the first deal profile;
wherein the request is a third HTTP/HTTPS request;
performing a third processing of the third request comprising:
receiving, by the software service provider, an encrypted third payload;
wherein the encrypted third payload is produced by encrypting a third payload, the third payload produced by the client, and wherein the third payload comprises information associated with the documents;
wherein the encrypted third payload is communicated to the software service provider from the client during the secure session using the secured connection;
identifying, by the software service provider, an IP address associated with the VPN;
allowing, by software service provider, traffic from the VPN based on the IP address;
decrypting, by the software service provider, the encrypted third payload;
performing a data extraction using the documents, wherein:
the data extraction uses OCR to recognize and/or parse at least some text of the documents;
identifying labels or data types in the recognized or parsed text, wherein the labels or data types may include income, expenses, rent, and/or time or date periods;
allowing creation, entry, editing, modification, and/or updating of the first property data or database fields associated with the first property data;
identifying a first factor and/or location associated with the first property address wherein the identifying the first factor and/or location associated with the property address comprises:
the software service provider forwarding a fourth HTTP/HTTPS request or query to at least one of a set of third party service providers, wherein the request is a geolocation request, and wherein the fourth request comprises:
a fourth payload;
wherein the fourth payload comprises at least a portion of the first property data;
the software service provider receiving a first third party response from at least one of the set of third party service providers, wherein:
the response includes latitude data, longitude data, and/or data to render a map of the property address and/or location associated with the query;

displaying, using the first set of GUIs, a map, the map comprising:
  a first element or icon representing a first property location at the property address;
  one or more streets surrounding the property address;
  one or more venues surrounding the property address;
calculating one or more metrics, wherein the metrics may include, for a particular time period, one or more principal payments, interest payments, returns, cash-on-cash returns, debt service coverage ratios, net operating incomes, and/or cap rates;
displaying and/or presenting the one or more metrics;
in response to creation, entry, editing, modification, and/or updating of the first property data, performing and/or re-performing calculating one or more metrics incorporating the updated data;
displaying and/or presenting the one or more updated metrics;
identifying one or more factors associated with the first property address wherein the identifying the one or more factors associated with the property address comprises:
  the software service provider forwarding a fifth HTTP/HTTPS request or query to at least one of a set of third party service providers, wherein the request is a rent estimate, property value, or property data request, and wherein the fifth request comprises:
    a fifth payload;
    wherein the fifth payload comprises at least a portion of the first property data;
  the software service provider receiving a third party response from at least one of the set of third party service providers, wherein:
    the response includes a rent estimate, property value, or property data associated with the query;
  in response to the query, performing, updating, and/or re-performing calculating one or more metrics incorporating the updated data;
displaying and/or presenting the one or more updated metrics;
in response, allowing creation, entry, editing, modification, and/or updating of the first property data or database fields associated with the first property data;
displaying, using the first set of GUIs, one or more projection models, wherein:
  the projection models may include one or more graphs, tables, charts, and/or visualizations;
  the projection models displaying estimated growth, investment returns, and/or comparisons of data;
updating the one or models in response to updates to the first property data and/or the one or more metrics;
displaying a pro forma associated with the deal or deal profile;
allowing creation of an offering memorandum (OM), wherein:
  the OM comprises at least some of the first property data, maps, images, and/or at least some of the projection models and/or model data;
allowing creation of a letter of intent (LOI), wherein:
  the LOI comprises terms input by the user and/or standard terms and/or at least some of the first property data;
  the first set of GUIs allows input of terms;
allowing sharing of the first deal profile with other parties, wherein the sharing may include:
  allowing access to at least some of the data in the first user account;
  sending and/or delivering the OM and/or LOI;
Embodiment 22 is a method according to the above.
Embodiment 23 is one or more computer readable media storing instructions to execute the above method.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

What is claimed is:

1. A system for analyzing one or more real estate deals or investments, the system comprising:
   at least one memory;
   one or more processors in communication with the at least one memory;
   one or more graphical user interfaces (GUIs);
   at least one database or data storage device;
   wherein the system is configured for:
      receiving, via the one or more GUIs, a first authentication request from a first user;
      allowing, via the one or more GUIs, the first user to add a first deal comprising a first multifamily property;
      creating, using the one or more processors, one or more database entries storing a unique identifier in association with the first deal in the at least one database or data storage device;
      allowing, via the one or more GUIs, upload of one or more documents, the one or more documents comprising first data, wherein the first data is associated with the first multifamily property;
      storing the one or more documents in association with the first deal in the at least one database or data storage device;
      allowing, via the one or more GUIs, the first user to add or update an address associated with the first multifamily property;
      displaying, via the one or more GUIs, one or more projection models, wherein the one or more projection models comprises:
         one or more graphs;
         one or more tables;
         one or more charts;
         one or more growth metrics; and/or
         one or more visualizations;
      allowing creation of an offering memorandum (OM), wherein the OM comprises at least some of the first data and/or at least some of the one or more projection models; and
      allowing sharing of the OM, wherein the sharing of the OM comprises sending and/or delivering the OM.

2. A system for analyzing one or more real estate deals or investments, the system comprising:
   at least one memory;
   one or more processors in communication with the memory;
   at least one database or data store;
   the system configured to:
      receive, via one or more GUIs, a first authentication request from a first user;
      allow, via the one or more GUIs, the first user to add a first deal for a first property;
      allow, via the one or more GUIs, upload of one or more documents, the one or more documents comprising first information, wherein the first information is associated with the first property, store the one or more documents in association with the first deal in the at least one database or data store;
      allow, via the one or more GUIs, the first user to add or update an address associated with the first property;
      display, via the one or more GUIs, one or more projection models, wherein the one or more projection models comprises:
         one or more graphs;
         one or more tables;
         one or more charts;
         one or more growth metrics; and/or
         one or more visualizations;
      allow creation of an offering memorandum (OM), wherein the OM comprises at least some of the first data and/or at least some of the one or more projection models; and
      allow sharing of the OM, wherein the sharing of the OM comprises sending and/or delivering the OM.

3. A method for analyzing one or more real estate deals or investments, the method comprising:
   receiving, via one or more graphical user interfaces (GUIs), a first authentication request from a first user;
   allowing, via the one or more GUIs, the first user to add a first deal comprising a first multifamily property;
   creating, using one or more processors, one or more database entries storing a unique identifier in association with the first deal in at least one database or data store;
   allowing, via the one or more GUIs, upload of one or more documents, the one or more documents comprising first data, wherein the first data is associated with the first multifamily property;
   storing the one or more documents in association with the first deal in the at least one database or data store;
   allowing, via the one or more GUIs, the first user to add or update an address associated with the first multifamily property;
   displaying, via the one or more GUIs, one or more projection models, wherein the one or more projection models comprises:
      one or more graphs;
      one or more tables;
      one or more charts;
      one or more growth metrics; and/or
      one or more visualizations;
   allowing creation of an offering memorandum (OM), wherein the OM comprises at least some of the first data and/or at least some of the one or more projection models; and
   allowing sharing of the OM, wherein the sharing of the OM comprises sending and/or delivering the OM.

4. A computer system, comprising:
   a display generation component or one or more graphical user interfaces (GUIs);
   one or more input devices;
   one or more processors; and
   memory storing one or more programs, wherein the one or more programs are configured to be executed by the one or more processors, the one or more programs including instructions for:
      receiving a first authentication request from a first user;
      allowing the first user to add a first deal comprising a first multifamily property;
      allowing upload of one or more documents, the one or more documents comprising first data, wherein the first data is associated with the first multifamily property;
      storing the one or more documents in association with the first deal;
      allowing the first user to add or update an address associated with the first multifamily property;
      displaying, via the display generation component or the one or more GUIs, one or more projection models, wherein the one or more projection models comprises:
         one or more graphs;
         one or more tables;
         one or more charts;
         one or more growth metrics; and/or
         one or more visualizations;
      allowing creation of an offering memorandum (OM), wherein the OM comprises at least some of the first data and/or at least some of the one or more projection models; and
      allowing sharing of the OM, wherein the sharing of the OM comprises sending and/or delivering the OM.

5. The computer system of claim 4, the one or more programs further including instructions for:
   creating a deal document based on the first data and the address associated with the first multifamily property.

6. The computer system of claim 5, the one or more programs further including instructions for:
   receiving a selection of a second user by the first user;
   based on the receiving the selection of the second user by the first user, sharing the deal document with the second user.

7. The computer system of claim 6, wherein:
the deal document comprises the OM.

8. The computer system of claim 6, wherein:
the deal document comprises a letter of intent (LOI).

9. The computer system of claim 6, wherein:
the deal document comprises a pro forma.

10. The computer system of claim 6, wherein:
the deal document comprises an investment summary.

11. The computer system of claim 5, wherein:
the deal document comprises the OM.

12. The computer system of claim 5, wherein:
the deal document comprises a letter of intent (LOI).

13. The computer system of claim 5, wherein:
the deal document comprises a pro forma.

14. The computer system of claim 5, wherein:
the one or more documents comprise a trailing-12 (T-12) document, a trailing-24 (T-24) document, or a profit & loss (P&L) document; and
wherein the one or more programs further include instructions for:
   parsing or extracting the first data using optical character recognition (OCR) to produce extracted data;

identifying the extracted data as a particular type of data; and classifying the extracted data as expense data.

15. The computer system of claim 14, the one or more programs further including instructions for:

allowing the first user to identify a second user and, in response, sharing the first deal document with the second user; and allowing the second user to modify data associated with the first deal.

16. The computer system of claim 15, the one or more programs further including instructions for:

determining a periodic return on a capital investment.

17. The computer system of claim 15, the one or more programs further including instructions for:

assigning a unique deal identifier;

storing the unique deal identifier in one or more databases;

associating data fields in the one or more databases with the first deal; and linking the first deal to a unique user identifier associated with the first user.

18. The computer system of claim 5, the one or more programs further including instructions for:

allowing the first user to identify a second user and, in response, sharing the first deal document with the second user; and allowing the second user to modify data associated with the first deal.

19. The computer system of claim 5, the one or more programs further including instructions for:

determining a region based on the address associated with a the first multifamily property;

creating a regional model based on the region; and creating a sales price model for the first deal.

20. The computer system of claim 5, the one or more programs further including instructions for:

creating one or more projections based on one or more factors;

presenting one or more charts, tables, graphs, or illustrations based on the one or more factors; and updating or receiving one or more updates to the one or more factors and, in response, updating the one or more projections to reflect the one or more updates to the one or more factors.

21. The computer system of claim 5, the one or more programs further including instructions for:

identifying property data associated with the first multifamily property comprising:

a square footage associated with the first multifamily property;

identifying second data from aggregated data based on the property data; and determining average rent per square foot associated with the first multifamily property.

22. A computer system, comprising:

a display generation component or one or more graphical user interfaces (GUIs);

one or more processors; and memory storing one or more programs, wherein the one or more programs are configured to be executed by the one or more processors, the one or more programs including instructions for:

receiving a first authentication request from a first user;

allowing the first user to add a first deal comprising a first property;

allowing upload of one or more documents, the one or more documents comprising first data, wherein the first data is associated with the first property;

storing the one or more documents in association with the first deal;

allowing the first user to add or update an address associated with the first property;

displaying, via the display generation component or the one or more GUIs, one or more projection models, wherein the one or more projection models comprises:

one or more graphs;

one or more tables;

one or more charts;

one or more growth metrics; and/or one or more visualizations;

allowing creation of an offering memorandum (OM), wherein the OM comprises at least some of the first data and/or at least some of the one or more projection models;

allowing sharing of the OM, wherein the sharing of the OM comprises sending and/or delivering the OM.

23. The computer system of claim 22, the one or more programs further including instructions for:

creating a deal document based on the first data and the address associated with the first property.

24. The computer system of claim 23, the one or more programs further including instructions for:

receiving a selection of a second user by the first user;

based on the receiving the selection of the second user by the first user, sharing the deal document with the second user.

25. The computer system of claim 24, wherein:

the deal document comprises the OM.

26. The computer system of claim 24, wherein:

the deal document comprises a letter of intent (LOI).

27. The computer system of claim 24, wherein:

the deal document comprises a pro forma.

28. The computer system of claim 24, wherein:

the deal document comprises an investment summary.

29. The computer system of claim 24, wherein:

the deal document comprises the OM.

30. The computer system of claim 23, wherein:

the deal document comprises a letter of intent (LOI).

31. The computer system of claim 23, wherein:

the deal document comprises a pro forma.

32. The computer system of claim 23, wherein:

the one or more documents comprise a trailing-12 (T-12) document, a trailing-24 (T-24) document, or a profit & loss (P&L) document; and wherein the one or more programs further include instructions for:

parsing or extracting the first data using optical character recognition (OCR) to produce extracted data;

identifying the extracted data as a particular type of data; and classifying the extracted data as expense data.

33. The computer system of claim 32, the one or more programs further including instructions for:

allowing the first user to identify a second user and, in response, sharing the first deal document with the second user; and allowing the second user to modify data associated with the first deal.

34. The computer system of claim 33, the one or more programs further including instructions for:
  determining a periodic return on a capital investment.

35. The computer system of claim 33, the one or more programs further including instructions for:
  assigning a unique deal identifier;
  storing the unique deal identifier in one or more databases;
  associating data fields in the one or more databases with the first deal; and
  linking the first deal to a unique user identifier associated with the first user.

36. The computer system of claim 22, the one or more programs further including instructions for:
  allowing the first user to identify a second user and, in response, sharing the first deal document with the second user; and
  allowing the second user to modify data associated with the first deal.

37. The computer system of claim 22, the one or more programs further including instructions for:
  determining a region based on the address associated with a the first property;
  creating a regional model based on the region; and
  creating a sales price model for the first deal.

38. The computer system of claim 22, the one or more programs further including instructions for:
  creating one or more projections based on one or more factors;
  presenting one or more charts, tables, graphs, or illustrations based on the one or more factors; and
  updating or receiving one or more updates to the one or more factors and, in response, updating the one or more projections to reflect the one or more updates to the one or more factors.

39. The computer system of claim 22, the one or more programs further including instructions for:
  identifying property data associated with the first property comprising:
  a square footage associated with the first property;
  identifying second data from aggregated data based on the property data; and
  determining average rent per square foot associated with the first property.

40. A method, comprising:
  receiving a first authentication request from a first user;
  allowing the first user to add a first deal comprising a first property;
  allowing upload of one or more documents, the one or more documents comprising first data, wherein the first data is associated with the first property;
  storing the one or more documents in association with the first deal;
  allowing the first user to add or update an address associated with the first property;
  displaying, via the display generation component or the one or more GUIs, one or more projection models, wherein the one or more projection models comprises:
  one or more graphs;
  one or more tables;
  one or more charts;
  one or more growth metrics; and/or
  one or more visualizations;
  allowing creation of an offering memorandum (OM), wherein the OM comprises at least some of the first data and/or at least some of the one or more projection models; and
  allowing sharing of the OM, wherein the sharing of the OM comprises sending and/or delivering the OM.

41. A non-transitory computer readable storage medium storing one or more programs, the one or more programs comprising instructions, which, when executed by a computer system with a display generation component and one or more input devices, cause the computer system to:
  receive a first authentication request from a first user;
  allow the first user to add a first deal for a first property;
  allow, via one or more GUIs, upload of one or more documents, the one or more documents comprising first information, wherein the first information is associated with the first property, store the one or more documents in association with the first deal;
  allow, via the one or more GUIs, the first user to add or update an address associated with the first property;
  display, via the display generation component or the one or more GUIs, one or more projection models, wherein the one or more projection models comprises:
  one or more graphs;
  one or more tables;
  one or more charts;
  one or more growth metrics; and/or
  one or more visualizations;
  allow creation of an offering memorandum (OM), wherein the OM comprises at least some of the first data and/or at least some of the one or more projection models; and
  allow sharing of the OM, wherein the sharing of the OM comprises sending and/or delivering the OM.

* * * * *